United States Patent Office 2,847,715
Patented Aug. 19, 1958

2,847,715

METHOD OF PRODUCING DIPPED ARTICLES FROM BUTYL RUBBER-POLYETHYLENE SOLUTIONS

Lucian P. Dosmann, South Bend, Ind., assignor to United States Rubber Company, New York, N. Y., a corporation of New Jersey No Drawing. Application October 14, 1953
Serial No. 386,105

2 Claims. (Cl. 18—58.4)

This invention relates to an article of manufacture which is made by a process involving dipping, which article has unusual resistance to highly corrosive chemicals, e. g., fuming nitric acid, and to the process of making such an article. Still more particularly, the invention relates to a technique whereby articles of the foregoing type can be made from a composition containing a major proportion of "Butyl rubber" which, as is well known is a sulfur-vulcanizable rubbery copolymer of a major proportion of isobutylene and a minor proportion of an aliphatic conjugated diolefin, almost invariably containing from 4 to 6 carbon atoms per molecule and typified by isoprene and butadiene, the proportions usually ranging from 90 to 99.5% of isobutylene and correspondingly from 10 to 0.5% of the diolefin.

The principal object of the present invention is to provide a procedure which enables the successful manufacture of dipped goods based upon Butyl rubber. Another object is to eliminate the blistering effect normally encountered when it is attempted to make dipped articles from dipping solutions containing Butyl rubber in large amount relative to other solids present in the dipping solution; normally when it is attempted to employ a dipping solution containing Butyl rubber in large proportion, the Butyl rubber forms a skin or film over the surface of the dipped article and this skin traps remaining solvent below it, producing a blistering effect which prevents the successful manufacture of dipped Butyl rubber articles by such a procedure. Numerous other objects of my invention will more fully hereinafter appear.

Broadly speaking, the process of my invention involves forming an intimate mixture of Butyl rubber, a substantial proportion of a filler and a curative for the Butyl rubber in amount sufficient to only partially cure the same, masticating this mixture at an elevated temperature, typically ranging from 300° F. upwardly to the point of thermal decomposition of the mixture, to cause the curative to react with the Butyl rubber and partially cure or prescorch it, cooling the thus partially cured mixture to a relatively low temperature, typically below 200° F., this temperature being so low that premature reaction of the subsequently added curative will not occur, and intimately incorporating therewith, by conventional milling or mastication, a substantial amount of polyethylene and an additional portion of curative in amount sufficient to complete the cure of the Butyl rubber component of the mixture during the final curing step, dissolving the resulting mixture in a volatile organic solvent for the partly cured Butyl rubber, e. g., benzene, toluol, xyol, or mixtures thereof to form a solution having a solids content suitable for dipping, dipping a form in the resulting solution while it is at a temperature sufficiently high to insure its being liquid, typically at 150–170° F., drying to remove the solvent, and curing the article thus formed on the dipping form by heating it at a temperature sufficiently elevated to cause the second portion of curative to react with the partially cured Butyl rubber and complete its cure. The curing is usually done at a temperature of at least 270° F. and more commonly at a temperature of at least 300° F.

The polyethylene functions in some manner, not yet fully understood, to eliminate the blistering difficulty referred to above. Apparently the polyethylene serves as a thermoplastic medium permitting escape of the solvent from all portions of the dipped article and preventing the surface of the layer on the dipping form from skinning over and trapping solvent underneath.

In practicing my invention I prefer to employ polyethylene having a molecular weight of from 8,000 to 12,000. An example of such a polyethylene is that sold as "Alathon 8" by the Du Pont Company. Use of polyethylene having the indicated molecular weight is advantageous because it induces a gel condition in the solvent Butyl system (i. e., the dipping solution) when it is cold, but at temperatures which are moderately elevated, e. g. 150–170° F., the dipping solution becomes liquid, lending itself ideally to a dipping process since it is possible to build up a layer of sufficient thickness by a single dipping operation, the form coated with the hot solution being simply allowed to cool to the point at which the coating on the form is converted to a gel or semi-solid condition such that it does not run off the form when the form is subjected to the high temperature required for the curing step.

The amount of polyethylene will usually range from 20 to 50 parts. Very satisfactory results are obtained at a 40 part level.

In practicing my invention, I often employ as a curative for the Butyl rubber an oil-soluble heat-reactive resinous condensation product of a para-hydrocarbon-substituted phenol and an aldehyde, typically formaldehyde or acetaldehyde. Phenol-aldehyde resins of this type are very well known in the art, being shown for example in Honel, U. S. Patent 2,058,797, Brubaker, U. S. Patent 2,046,318, Turkington et al., Ind. Eng. Chem., 33, 966 (1941) and Shreve et al., ibid., 43, 134 (1951). As is well known, phenolic resins of this type are commonly made by reacting a para-hydrocarbon-substituted phenol, e. g., phenol substituted in the para position with an alkyl group having from 4 to 20 carbon atoms, tertiary butyl, tertiary amyl and octyl being especially preferred alkyl groups, or with an aryl group, e. g., phenyl (as in the case of p-phenyl phenol), with a saturated aliphatic aldehyde, especially formaldehyde or acetaldehyde, using a molecular excess of the aldehyde over the phenol and carrying out the condensation reaction in the presence of an alkaline catalyst. The condensation reaction is stopped at an intermediate point, giving a resin which is solid at ordinary room temperature but which is oil-soluble and heat-reactive, i. e., it is capable of advancing upon being subjected to heat.

Use of phenolic resins of the foregoing type as curatives for Butyl rubber is the subject of copending application of Tawney et al. Serial No. 266,146, filed January 12, 1952, and allowed August 30, 1954, Patent No. 2,701,895.

When a phenolic resin curative of the type just described is employed in the practice of my invention, I secure very good results by incorporating from 0.5 to 2 parts thereof initially for effecting the partial cure and subsequently incorporating an additional portion thereof sufficient to give a total of from 3 to 15 parts. All parts of ingredients other than Butyl rubber mentioned herein are by weight based on 100 parts of Butyl rubber.

I often prefer to accelerate the partial curing of the Butyl rubber with the initially introduced phenolic resin by performing this step in the presence of a heavy metal halide. Any heavy metal halide can be used as the accelerator. The heavy metals are listed in the periodic chart of the elements by Deming reproduced on pages 58 and 59 of "Handbook of Chemistry," edited by Lange, sixth ed., 1946. Examples of accelerators are crystalline stannous chloride and crystalline ferric chloride. The use of two parts of such an accelerator gives very good results. The accelerating action of such heavy metal halides is the subject of copending application of Peterson et al. Serial No. 329,444, filed January 2, 1953, now Patent No. 2,726,224.

A phenolic resin of the above type is the preferred curative for making articles which must have good heat resistance. An example of such articles is gloves used by workers handling such dangerous materials as fuming nitric acid. An article produced by my invention with the use of a phenolic resin curative exhibits remarkable resistance to fuming nitric acid. Whereas a film of polyvinyl chloride will transmit the fumes of fuming nitric acid in five minutes and will transmit liquid fuming nitric acid in 50 minutes, the phenolic resin cured material of my invention, having a similar film thickness, will transmit fuming nitric acid fumes in 210 minutes and will not transmit liquid nitric acid until after 24 hours.

For those applications where good heat resistance is not important, e. g. in articles of clothing other than gloves such as coveralls, trousers, coats, etc., good results are obtained by proceeding in the manner described above but using another curative for the Butyl rubber, especially para-dinitrosobenzene (which is available commercially as "Polyac" which is a mixture of 25% para-dinitrosobenzene and 75% of inert carrier). In using para-dinitrosobenzene as the curative, I prefer to employ from 0.025 to 0.1 part thereof to effect the pre-cure of the Butyl rubber around the filler and subsequently to incorporate (at the same time as the polyethylene) sulfur, and tetra-methyl thiuram mono sulfide or other suitable curing agents furnishing sulfur to complete the cure of the Butyl rubber. When "Polyac" is used for pre-curing, due allowance must be made for the diluent effect of the filler, i. e., for the fact that the commercial material is only 25% active; the range given is for the active material. In the typical practice of this embodiment of my invention, I use 0.2 part of "Polyac" which furnishes 0.05 part of actual para-dinitrosobenzene.

The amount of filler used is usually equal to at least 30 parts and may range upwardly from this figure to 100 parts. Amounts greater than 70 parts exceed the saturation point where the gelled Butyl can adequately absorb the filler, and this results in faster permeability or diffusion to nitric acid vapor. Therefore I prefer to use not more than 70 parts of filler. The filler is almost invariably a material which is insoluble in the solvent used to make the dipping composition. Examples of suitable fillers are titanium dioxide and carbon black.

Where a phenolic resin is used to bring about the partial curing, the cure can be completed with a phenolic resin or with sulfur, or materials which yield sulfur, and accelerators of the type commonly used with sulfur in vulcanizing rubber. Where para-dinitrosobenzene is used for pre-curing, the cure is completed with sulfur, or curatives supplying sulfur, and the usual accelerators.

The preferred solvent for making the dipping composition is toluol. I prefer to cut a milled mixture of the pre-cured Butyl rubber-filler mixture, the additional curative and the polyethylene into hot toluol, the toluol typically being used at a temperature of 150–170° F. although the temperature may range as high as 180 to 190° F. Usually I form a mixture having a solids content of 15 to 25%, the balance being toluol or other volatile organic solvent.

Generally speaking, the dipping and curing techniques are conventional. The usual dipping forms are employed and they can be either hot or cold. With cold forms dipped into a dipping solution having a temperature of 150–170° F., the deposit is slightly heavier than is the case when hot forms are used. After dipping, the coated forms are usually allowed to cool down slightly for gel formation and to undergo drying to remove a major proportion of the toluol by evaporation, after which the dipped articles are cured by heating the coated forms to a temperature of at least 270° F. for a time sufficient to complete the cure of the Butyl rubber with the second portion of curative. The curing is conveniently accomplished by passing the coated form through a heated air oven. Following curing, the cured article is stripped from the form and is now ready for use.

The drying step can be performed in any suitable way. If desired the dipped forms can be slow dried at about 175° F. using forced dry air or other suitable means.

The following examples illustrate my invention in more detail.

*Example 1*

A uniform homogeneous mixture of the following ingredients is first prepared by mixing in a Banbury mixer for 4 minutes at 200° F.:

| | Parts by weight |
|---|---|
| GR–I–15 (Butyl rubber having a minimum Mooney viscosity of 40) | 100 |
| Titanium dioxide | 55 |
| "Super Beckacite 1003" (oil-soluble heat-reactive para-tertiary butyl phenol-formaldehyde resin made with an excess of formaldehyde and with an alkaline catalyst) | 1 |

After these materials have been intimately mixed, two parts of stannous chloride (crystalline material containing two molecules of water of crystallization) were introduced into the Banbury mixer whereupon the mixture was mixed for 10 minutes at 325° F., bringing about pre-curing of the Butyl rubber in combination with the filler with the phenolic resin. The resulting mixture was then discharged from the Banbury mixer and placed on an ordinary open rubber mill at a temperature of 180° F. whereupon 7 more parts of the "Super Beckacite 1003" and 40 parts of "Alathon 8" were added and intimately incorporated by milling. Thereupon the mixture was cut into hot toluol to give a solution having a solids content of 15–20%. A dipping last having the form of a glove was then dipped into the hot solution, removed, allowed to dry, and cured at 300° F. for 60 minutes. The coated last was cooled and the glove was stripped therefrom. It exhibited remarkable resistance to fuming nitric acid and to corrosive chemicals generally.

*Example 2*

The following masterbatch was prepared in a Banbury mixer at low temperature:

| | Parts by weight |
|---|---|
| GR–I–15 | 100 |
| "Furnex" (carbon black) | 55 |
| "Polyac" | 0.2 |
| Zinc oxide | 2.5 |

This masterbatch was then masticated for 10 minutes in a Banbury at 300–325° F. to effect the pre-cure. The zinc oxide activates the pre-cure and is available later for vulcanization.

The resulting mixture was placed on a rubber mill at 175° F. whereupon the following additional ingredients were added:

| | Parts by weight |
|---|---|
| Sulfur | 2.0 |
| "Monex" (tetramethyl thiuram disulfide) | 1.0 |
| "Aminox" (acetone-diphenylamine reaction product) | 1.0 |
| "Alathon 8" | 40.0 |

These ingredients were intimately incorporated by milling at 175° F. The resulting mixture was then cut into hot toluol to give a dipping solution having 15 to 25% solids. If desired, 30 parts of "Oppanol B-200" (polyisobutylene) can be incorporated in the 175° F. milling step to give improved acid- and flex-resistance. In either event the solution gives excellent results when used in the manner of Example 1.

Having thus described my invention, what I claim and desire to protect by Letters Patent is:

1. The process which comprises forming an intimate mixture of 100 parts by weight of an isobutylene-diolefin rubbery copolymer, from 30 to 70 parts of a filler, and a curative for said copolymer in amount sufficient to partially but incompletely cure said copolymer, masticating said mixture at a temperature at which said curative pre-cures said copolymer, whereby the copolymer becomes partially cured but is still susceptible of further cure, cooling the resulting mixture, intimately incorporating with the resulting mixture, at a temperature at which the subsequently added curative will not react, from 20 to 50 parts of polyethylene having a molecular weight of from 8,000 to 12,000, and a curative in amount sufficient to complete the cure of said copolymer, dissolving the resulting mixture in a volatile organic solvent to a solids content of from 15 to 25%, dipping a form having the configuration of the desired final article in the resulting solution while it is at a temperature of from 150 to 190° F. and is in liquid form, drying the coating thus formed, the said polyethylene serving as a thermoplastic medium through which solvent escapes from all portions of the said coating and the said polyethylene preventing the said coating from skinning and trapping solvent underneath such skin, and thereafter curing the article thus formed on said form by heating at elevated temperature.

2. The process of claim 1 wherein said curative is an oil-soluble heat-reactive resinous para-hydrocarbon-substituted phenol-aldehyde condensation product and wherein the amount thereof incorporated initially is equal to from 0.5 to 2 parts per 100 parts of said copolymer and the amount thereof subsequently incorporated is such as to give a total amount thereof equal to from 3 to 15 parts.

References Cited in the file of this patent

UNITED STATES PATENTS

| | | |
|---|---|---|
| 2,383,839 | Beekley | Aug. 28, 1945 |
| 2,414,394 | Rumbold | Jan. 14, 1947 |
| 2,542,353 | Picard | Feb. 20, 1951 |
| 2,656,297 | Davis | Oct. 20, 1953 |